United States Patent [19]

Bingham

[11] 4,406,320
[45] Sep. 27, 1983

[54] PROTECTING COVER FOR AUTOMOBILE WINDOWS

[76] Inventor: Richard Bingham, 2549 W. Eastwood, Chicago, Ill. 60625

[21] Appl. No.: 162,526

[22] Filed: Jun. 24, 1980

[51] Int. Cl.³ .............................................. A47H 3/00
[52] U.S. Cl. ................................................ 160/368 S
[58] Field of Search ............ 160/DIG. 2, 354, 368 R, 160/368 G, 368 S, 368.2; 296/95 C, 95 R; 2/51, 52, 48, 24, 11, 15, 20

[56] References Cited

U.S. PATENT DOCUMENTS

| | | | |
|---|---|---|---|
| 858,296 | 6/1907 | Larsen | 2/24 |
| 1,675,072 | 6/1928 | Watermon | 2/48 Y |
| 2,489,901 | 11/1949 | Kocinski | 160/368 S |
| 2,643,711 | 6/1953 | Smith | 160/DIG. 2 |
| 2,821,248 | 1/1958 | Irvine | 160/368 S |
| 2,997,103 | 8/1961 | Buchaman | 160/369 |

FOREIGN PATENT DOCUMENTS 1102604  2/1968  United Kingdom ............. 296/95 C

OTHER PUBLICATIONS

Popular Science, Jan. 1956, p. 229.

*Primary Examiner*—Peter M. Caun
*Assistant Examiner*—Cherney S. Lieberman
*Attorney, Agent, or Firm*—Hume, Clement, Brinks, Willian & Olds, Ltd.

[57] ABSTRACT

Covers for windshields, side windows, and rear windows of automobiles each comprising a covered sheet material resistant to snow, water, ice and sleet of size and shape to overlie the portion of the glass to be protected from accumulations of snow, ice, and sleet when the automobile is left standing outside in stormy and freezing weather, and a band or cord attached to the cover for holding the same in place and adapted to be horizontally disposed outside of the automobile over the area to be protected and having its two ends extending through a door or doors of the automobile with portions of the band or cord pinched between the adjacent door and door frame when said door is closed against said door frame whereby to hold the covers in place with ends of the band fastened in the interior of the automobile whereby when the doors are locked the ends of the holding band are protected against unwanted tampering.

1 Claim, 9 Drawing Figures

U.S. Patent    Sep. 27, 1983    Sheet 1 of 2    4,406,320
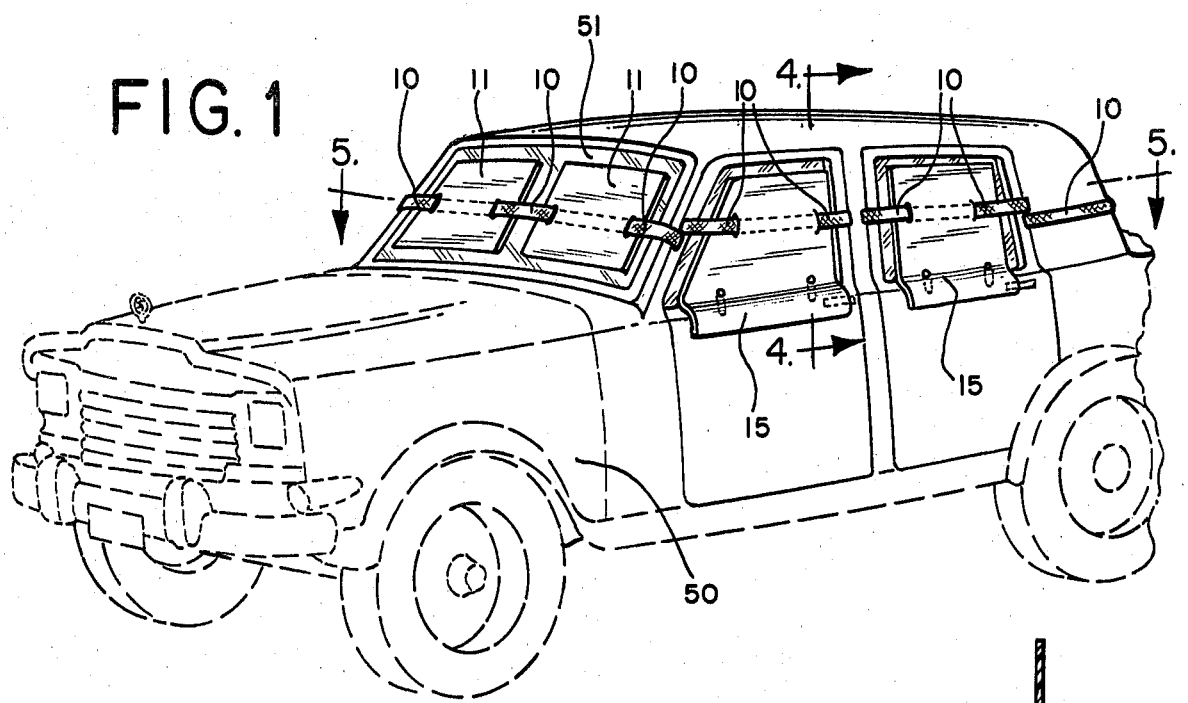
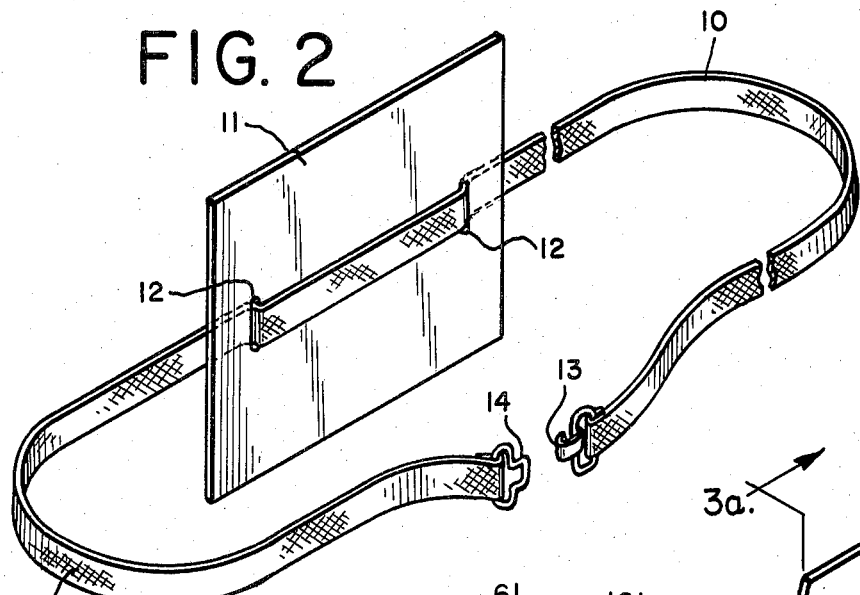
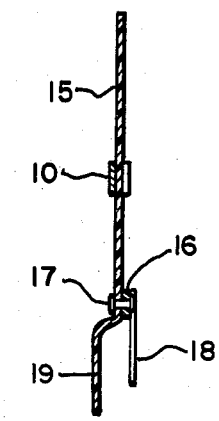
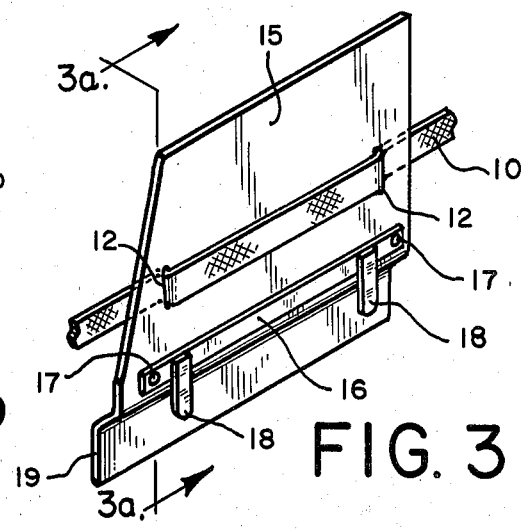
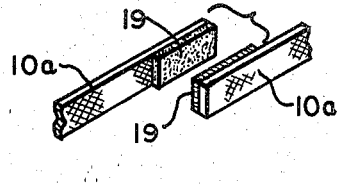

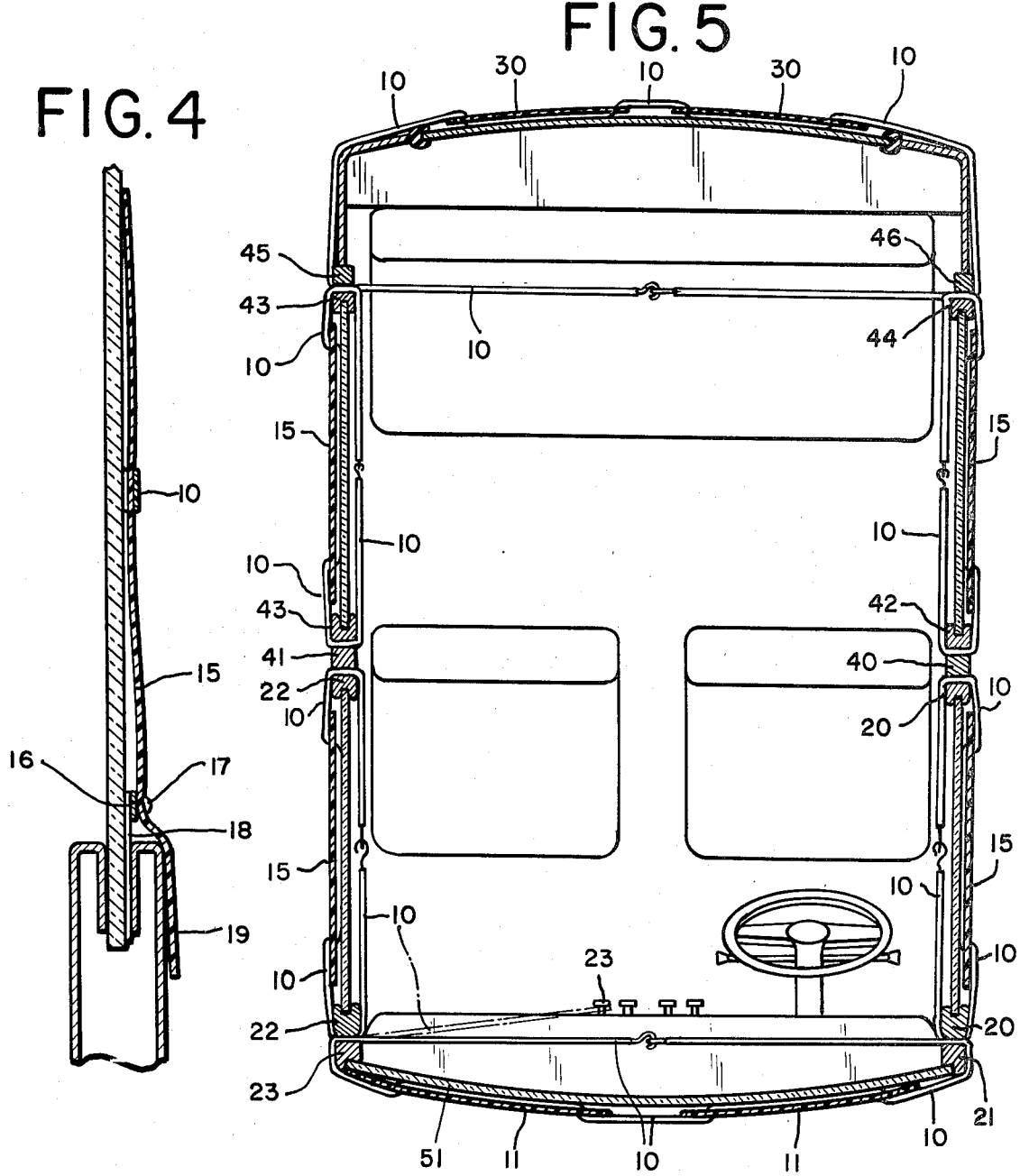

PROTECTING COVER FOR AUTOMOBILE WINDOWS

This invention relates to efficient and inexpensive protecting covers for windshields and side and rear windows of automobiles which serve to shield the windshields and windows so covered from accumulations of ice and snow when standing outside in cold and freezing weather.

BACKGROUND OF THE INVENTION

It is well known that automobiles when standing unprotected out of doors during cold and stormy weather particularly when parked for extended periods or during the night accumulate snow and ice when the weather is productive of snow, rain or sleet during freezing temperatures. It is also well known that such accumulations so impair the visibility of the driver that it is unsafe to drive an automobile having such accumulations and that accordingly it becomes necessary to remove such accumulations before driving the automobile is undertaken.

Inasmuch as the removal of ice and similar accumulations from the glass surfaces of the windshields and windows of automobiles is often very difficult to successfully achieve within a reasonable time it is recognized as desirable to prevent, if possible, the occurrence of such accumulations in the first place.

To this end various types of covers have been proposed in the past but as far as this applicant knows none of the prior devices has been sufficiently satisfactory to be adopted for general use. Such prior art devices have been either too complicated or expensive and in most instances have been too difficult and time consuming to install to permit their wide spread adoption and use.

Accordingly, it is an object of this invention to provide protective covers for the windshields and side and back windows of automobiles which are simple in construction, are highly efficient in use and which can be installed by procedure which is easy and relatively quick to perform.

It is a further object of this invention to provide such protective covers which utilize a band or belt-like strip or cord, the ends of which are fastened together or otherwise fastened inside of the automobile and which extend outwardly between doors and their door frames respectively so, that when the doors are closed and locked the holding action of the doors and associated door frames serve to pinch and hold the holding strips or cords and thus provide additional holding action as well as render inaccessible the attached ends of the strips or cords. Devices so installed accordingly are protected against theft unless the strips or cords are damaged by cutting such as would impair their further use.

It is a further object to provide separate covers for the windshield, for each of the side windows and the rear window each of which can be separately applied and used independently of the others and all of which embody the same basic construction and can be installed for use by the same basic procedure.

More specifically it is an object of this invention to provide covers of the type referred to which comprise an elongated elastic band or strip which when applied to the windshield extends generally horizontally across the front of the windshield with its two ends extending one to each side and thence backwardly and inwardly to the inside of the automobile through the two opposite door openings and then fastened inside, preferably by attaching the two ends together and the band having threaded thereon a suitable cover piece or pieces of size and shape desired to cover the areas of the glass to be protected from snow or ice, and the cover piece of pieces being slidable along the band permitting it to be placed in its desired position after the band has been placed across the windshield and tightly held in the manner described.

It is contemplated that the invention when constructed in the manner above described and the ends of the band have been fastened inside of the automobile that the two doors be shut and locked so that the attachment of the band ends cannot be tampered with.

It is a further object of this invention to provide similarly constructed and installed bands and covers for each side window and for the rear window of the automobile and in each case to provide a horizontally disposed band across the glass of the window to be protected with a suitably shaped cover threaded on and slidably adjustable horizontally thereon and with the ends of the band extending around the side edges of a window glass in the case of a side window and around the rear portion of the automobile to the nearest door openings in the case of a rear window and thence into the inside of the automobile where the ends of the band are fastened to each other in a manner to hold the cover tightly against the outside of the window glass and at the proper horizontal level to place the cover in the desired position.

It is a further object of this invention to provide protective covers of the type above referred to which when applied to covers for the side windows may in addition be provided with attached holding means adapted to extend downwardly between the outside surface of the glass of the window and the inside surface of the door housing, so positioned and constructed as to provide a depending lower portion of the cover in the nature of a skirt in position to shield the space between the window glass and the door housing to prevent the flow of water and snow and the like downwardly into the housing space in the door, and thus to serve to deflect such flow outside and below such space.

These and other objects are contemplated for this invention as will readily appear to one skilled in the art from the following description of one preferred embodiment of this invention.

BRIEF DESCRIPTION OF THE DRAWINGS

In the drawings:

FIG. 1 is a perspective view of an automobile equipped with windshield covers, side door covers, and a rear window cover constructed and installed in accordance with this invention; and FIG. 2 is a perspective view of a band and one associated cover constructed in accordance with this invention and illustrating the appearance when it is not installed in an automobile; and FIG. 2a is a perspective view of a fragment of the band ends similar to the showing of the band ends in FIG. 2, but showing the use of VELCRO for attaching the ends instead of the use of the hook and ring type fastener shown in FIG. 2; and FIG. 2b is a perspective view of a fragment of the band ends similar to the showing in FIG. 2, but illustrating a modified type of fastener namely one similar to the fasteners employed on trunk and similar straps and which may be employed with non-elastic or non-stretchable bands.

FIG. 3 is a perspective view of one of the covers of this invention employed for use on the side windows of an automobile and illustrating the holding means for extending downwardly between the glass of the window and the inside of the door housing so as to hold the cover and its protecting skirt portion to shield the space between the glass and the door housing; and FIG. 3A is a vertical cross sectional view taken on the line 3a—3a as shown on FIG. 3 and looking in the direction of the arrows; and FIG. 4 is a vertical cross sectional view taken on the line 4—4 as shown in FIG. 1 and looking in the direction of the arrows; and FIG. 5 is a plan view partly in cross section and taken on the line 5—5 as shown on FIG. 1 and looking in the direction of the arrows.

FIG. 6 is a fragmentary view of the modified form of band and cover of the type shown in FIG. 2 showing the top edge of the cover as folded over in the direction of the contact surface with the glass to be protected to provide a modified sealing edge at the top of the cover.

DESCRIPTION OF PREFERRED EMBODIMENT OF THE INVENTION

Referring particularly to FIG. 2 of the drawing it will be noted that one form of this invention comprises an elongated flexible band or belt-like strip 10 and one or more protective cover pieces 11 which in the illustrated form is threaded onto the band or strip 10 by having openings 12—12 therein through which the band or strip is passed in the manner illustrated. The ends of the band or strip are equipped with attaching means such as the hook 13 and the ring 14.

As shown in FIG. 1 the form of this invention illustrated as applied to the windshield of the automobile designated generally as 50 and having a windshield 51 of usual construction is equipped with two covers each constructed and shaped like that shown in FIG. 2. It is to be understood that a single cover of greater width may be employed to protect both sides of the windshield instead of the two separate covers illustrated as this is a matter of personal choice and each will serve well in carrying out the purposes of the invention although the two smaller covers will make a smaller package for storing when not in use.

As best shown in FIGS. 1 and 5 the windshield covers 11—11 are held by a single band or strip 10 which extends horizontally across the front of the windshield and then rearwardly and inwardly at each side of the windshield and into the interior of the car with the hook 13 on one end of the band engaging the ring 14 on the other end of the band. It will be noted that in assuming this position the band passes between the door 20 on one side of the automobile and its associated door frame 21 and the door 22 and its associated door frame 23 on the other side of the automobile. Also that when the door is closed as shown in the drawings the two portions of the band passing between the doors and door frames will be pinched by the closed doors and held securely in place and that when the doors are locked unwanted access to the attached ends of the band is effectively prevented. When the band is non-adjustable in length as the band shown in FIG. 2 it is preferable to have the band made of elastic material such as a woven elastic cloth so that it can be stretched when hooked in position. This requires that the band before being stretched is somewhat smaller than the distance to be covered, by an amount to provide the desired holding force depending upon the strength of the elastic employed in the band. When the band is non-elastic the ends may be attached by a holding buckle of the type illustrated in FIG. 2b which permits the band to be drawn to a tight holding length and held by the buckle in the position required. As shown in FIG. 2b this type of buckle is conventional and consists of a body piece 61 attached to the end of the band 10b by the folded back end and rivet 62 enclosing a cross piece (not shown) formed integrally with the body piece 61, and having a sliding toothed bar 63 for engaging the other end of the band when the same is placed in the proper holding position.

If desired the ends of the band may be provided with Velcro attaching portions as shown in FIG. 2a in which case the band may be elastic or non-elastic as desired.

The covers may be made of any suitable sheet material provided only that they be strong and rigid enough to hold firmly against the window glass and to be resistant to damage that could be caused from association with snow, ice and sleet when in use. Sheets of plastic material such as polyethylene, polyvinyl chloride, polypropylene, teflon, and the like may be used. Also plastic impregnated fabric having the desired degree of rigidity and weather resistance will serve well. In addition sheets of one or more of the above named plastics may be laminated with a sheet or sheets of fiber board or like fibrous material placed inside between the protective plastic sheets will serve well for the cover material.

When installing the covers of this invention on the windshield 51 of an automobile 50 it is desirable first to place the covers on the windshield in their approximate places to protect the windshield and to hold the covers so placed by the windshield wipers which can be lifted and lowered on the covers respectively and thereafter to open the front door on one side of the automobile and next to project one end of the band into the interior of the automobile through the crack between open door and its door frame at the hinge side thereof and then to shut the door on the band so projected so that the band is tightly held between the door and door frame. Thereafter the other end of the band on the opposite side of the automobile is projected through the crack between the door and door frame on that side of the automobile into the interior of the automobile and after the entire band is stretched the hook 13 is moved into holding engagement with the ring 14. Finally both doors are closed and locked so that the ends of the bands are protected against unwanted tampering.

If desired the installation may also be accomplished as follows; first, both front doors are opened and one end of the band 11 is temporarily attached to some object inside the car such as one of the knobs 23 on the dashboard as shown in dashed lines in FIG. 5. The band is thereafter extended out through the open door between the door and door frame adjacent the hinge edge of the door and thereafter forwardly and across the windshield in a horizontal position and then back through the opposite door between the door and door frame and into the car. When this is accomplished the temporary attachment on the knob 23 is released and the hook 13 is engaged with the ring 14 which will require that the band be stretched the proper amount to hold the covers in firm engagement with the outside surface of the windshield. Thereafter the doors of the automobile should be closed and locked.

As particularly shown in FIGS. 1, 3 and 3a the covers for the side windows also may be slightly modified to provide a skirt portion for covering the crack that exists between the outside surface of the window glass and the opposed inside surface of the window housing in the door. As illustrated the lower edge of the cover may be preformed so that it will readily accommodate itself to the window sill of the door to cover the crack above identified. As shown in FIGS. 3 and 3a the door covers 15 may be provided with a horizontal strip 16 preferably of metal attached to the cover by rivets 17—17 or other suitable means. Strip 16 has integrally attached thereto two downwardly depending fingers 18—18 which are adapted to fit into the space between the window glass and the wall of the door housing and extend downwardly in a manner to hold the cover at its lower edge in position to cover the crack referred to. The strip 16 and the fingers 18—18 are located on the cover somewhat above the lower edge of the cover so as to provide a skirt portion 19 which extends downwardly below the crack in the window sill to constitute a deflecting surface for water, snow, and ice. When the invention is applied to the side windows of an automobile the construction of the holding band and cover may be the same as those shown in FIG. 2 except possibly for the size of and the shape of the cover and the fact that in all instances only one cover is needed. The shape may be rectangular as shown in FIG. 2 or it may be shaped to conform to the outline of the window. In all cases however the holding band may be applied in a horizontal relation to the window and at a level to properly locate the cover in a protective position on the glass. The band is then extended inwardly around the opposite side edges of the window and then attached to each other with the hook 13 and the ring 14 in a manner previously described in connection with the application of the windshield covers. When the door is closed the two portions of the band which occupy the spaces between the door and door frame are pinched therebetween and are effectively held against unwanted movement. Furthermore when the door is locked the cover is maintained in protective position on the window and unwanted access to the ends of the band is effectively prevented. The band 10 for holding the side door covers may be threaded through openings 12—12 in the cover 15 so that in construction and operation the cover and band for the side windows are basically the same as the equivalents parts employed for the windshield covers.

The same construction and installation procedure are employed for covers of the rear side door windows as will be apparent from the showings in FIGS. 1 and 2 of the drawings.

The cover 30 for the rear window is similarly constructed and has a band 10 which in all respects is like the band 10 and cover 11 shown in FIG. 2. Whereas it is shown in FIG. 5 as a single relatively wide cover it could be made of two separate covers like those shown in FIG. 1 for the windshield. Preferably however if a two-piece cover is employed so as to gain a smaller package for storing when not in use, it generally is desirable to place them in edge to edge contact for protecting a larger single area of the rear window glass instead of protecting two separated areas as shown in FIG. 1. As best shown in FIG. 5 the cover 15 for the side door and the right side has its band 10 pinched between the door 20 and the door frame 21 at its front edge and the door 20 and the door frame 40 at the rear edge of the door. Similarly, the cover 15 on the opposite door has its band 10 pinched between the door 22 and the door frame 23 at its front edge and the door 22 and the door frame 41 at its rear edge. In like manner the two rear side doors have their bands 10 for holding their covers 15 pinched between the door 42 and door frame 40 and door 44 and door frame 46 on the right hand door, as seen in FIG. 5, and between the door 43 and door frame 41 and the door 43 and door frame 45 on the left hand door, as seen in FIG. 5.

The cover 15 for the rear window has its band 10 pinched between door 44 and the door frame 46 in the right side of the automobile, as shown in FIG. 5, and between the door 43 and door frame 45 on the left side of the automobile, as shown in FIG. 5.

As illustrated in FIG. 6 the upper edge of the covers 11 and 15 may be folded over toward the glass surface to be protected as at 60 so as to make the upper edge slightly thicker whereby a good sealing surface between the cover and the glass is assured at all times. It will readily appear to one skilled in the art that the particular material employed for the covers is not critical to this invention and that there are many materials now known and available that will serve well in this use. It is only necessary to provide covers from sheet material that may be held against the glass of the windshield and windows that is sufficiently strong and rigid to maintain good protective contact with glass when held thereagainst by the holding bands and which provides sufficient resistance to the water, ice, and snow to which it will be exposed in use.

Furthermore it is to be understood that the words band, strip, belt-like strip and cord have been used herein to identify the elongated holding member which supports the covers. These terms are used interchangeably as it is not critical to this invention whether the holding member is flat cord-like or rope-like or whether it is elastic or not. Any form of holding means will serve satisfactorily.

Also it is not essential to the broadest concept to have the covers slidably threaded onto the bands as the only essential feature is to hold the covers in place and this could be done by having the holding band attached by rivets or other means to the band at the desired locations therealong and in such cases the band need not be continuous as a band. It is to be recognized however that when the covers are slidably adjustable along the length of the band the installation of the cover is made easier as the band can be applied and the ends connected without concern about the resulting location of the covers as the covers can thereafter be moved along the band into their proper positions without moving the band.

It should also be recognized that the bands 10 can be made of non-elastic material and made shorter than is required in use when it is used in conjunction with and additional length of an elastic material such as a strong band of rubber or the like provided with means to attach the same between the two spaced ends of the non-elastic portion of the band.

Other forms of the invention are contemplated for this invention as will readily appear to one skilled in this art and as may be included within the scope of the appended claims.

I claim:

1. A cover for side door windows of automobiles comprising a cover of sheet material resistant to snow, water and ice of size and shape to overlie the portion of the glass to be protected and a band for holding the cover adapted to be horizontally disposed outside of the automobile over the area to be protected and having its ends extending between the door and door frame on both sides of the door with portions of the band on both sides pinched between the door and door frame when the door is closed and with the ends of the band fastened in the interior of the automobile whereby when said door is locked, the ends of said band are protected against unwanted tampering, the cover having openings therethrough and the band being threaded through said openings to permit the cover to slide along the band whereby after the ends of the band have been fastened inside the automobile and the automobile doors have been closed said cover may be accurately adjusted to overlie the portion of the window to be protected without reliance on the location of the ends of the band inside the automobile, the cover further having downwardly extending fingers of relatively rigid material attached to its inside surface above the bottom edge thereof, the fingers being adapted to be inserted into the space at the window sill between the outside window surface and the opposed inside surface of the window housing, the portion of said cover below the attachment points of the fingers constituting a depending skirt disposed outside of said door and covering and protecting the space at the window sill between the outside window surface and the opposed inside surface of the window housing.

* * * * *